(12) United States Patent
Levecq et al.

(10) Patent No.: US 6,392,755 B1
(45) Date of Patent: May 21, 2002

(54) OPTICAL DEVICE FOR THE CONTACTLESS MEASUREMENT OF DISTANCE OF A LIGHT SOURCE

(75) Inventors: Xavier Levecq, Gif sur Yvette; Samuel Bucourt, Bures sur Yvette, both of (FR)

(73) Assignee: Imagine Optic, Orsay Cedex (FR)

( * ) Notice: Subject to any disclaimer, the term of this patent is extended or adjusted under 35 U.S.C. 154(b) by 0 days.

(21) Appl. No.: 09/381,456

(22) PCT Filed: Mar. 20, 1998

(86) PCT No.: PCT/FR98/00572

§ 371 Date: Sep. 21, 1999

§ 102(e) Date: Sep. 21, 1999

(87) PCT Pub. No.: WO98/43112

PCT Pub. Date: Oct. 1, 1998

(30) Foreign Application Priority Data

Mar. 21, 1997 (FR) .............................. 97 03457

(51) Int. Cl.[7] ............................... G01B 11/14
(52) U.S. Cl. ........................ 356/614; 356/623
(58) Field of Search ................ 356/614–624, 356/602, 608, 301, 302–308

(56) References Cited

U.S. PATENT DOCUMENTS

| 4,749,848 A | * | 6/1988 | Sorimachi |
| 5,233,174 A | * | 8/1993 | Zmek |
| 5,361,127 A | * | 11/1994 | Daily |
| 5,493,391 A | * | 2/1996 | Neal et al. |
| 5,557,323 A | * | 9/1996 | Kajiwara |

FOREIGN PATENT DOCUMENTS

| DE | 36 42 196 | * | 6/1988 |
| DE | 44 44 593 | * | 5/1997 |
| EP | 0 561 353 | * | 11/1996 |
| EP | 0 762 143 | * | 3/1997 |
| EP | 0 558 026 | * | 3/1999 |

OTHER PUBLICATIONS

E. Adelson et al., "Single Lens Stereo with a Plenoptic Camera", *IEEE Transactions On Pattern Analysis And Machine Intelligence*, vol. 14, No. 2, Feb. 1, 1992, pp. 99–106.*

* cited by examiner

*Primary Examiner*—Frank G. Font
*Assistant Examiner*—Amanda Merlino
(74) *Attorney, Agent, or Firm*—Young & Thompson

(57) ABSTRACT

The invention concerns an optical device for the contactless measurement of the distance of a light source (4) comprising optical detecting means (7) consisting of elementary sensors and further comprising: a set of N imaging means (SP1, SP2, SP3), $N \geq 3$, that enable image acquisition of the light source on a plane in the proximity of the detecting means thereby forming with said means a set of hot spots, each spot spreading over at least two elementary sensors; a circuit for computing, on the basis of the relative positions of at least three hot spots, at least one characteristic parameter of the distance from the light source whereof the accuracy depends on N number of hot spots. The measuring device is characterized in that it is designed for industrial measurements (of dimensions, texture, position, vibrations, displacement).

13 Claims, 7 Drawing Sheets

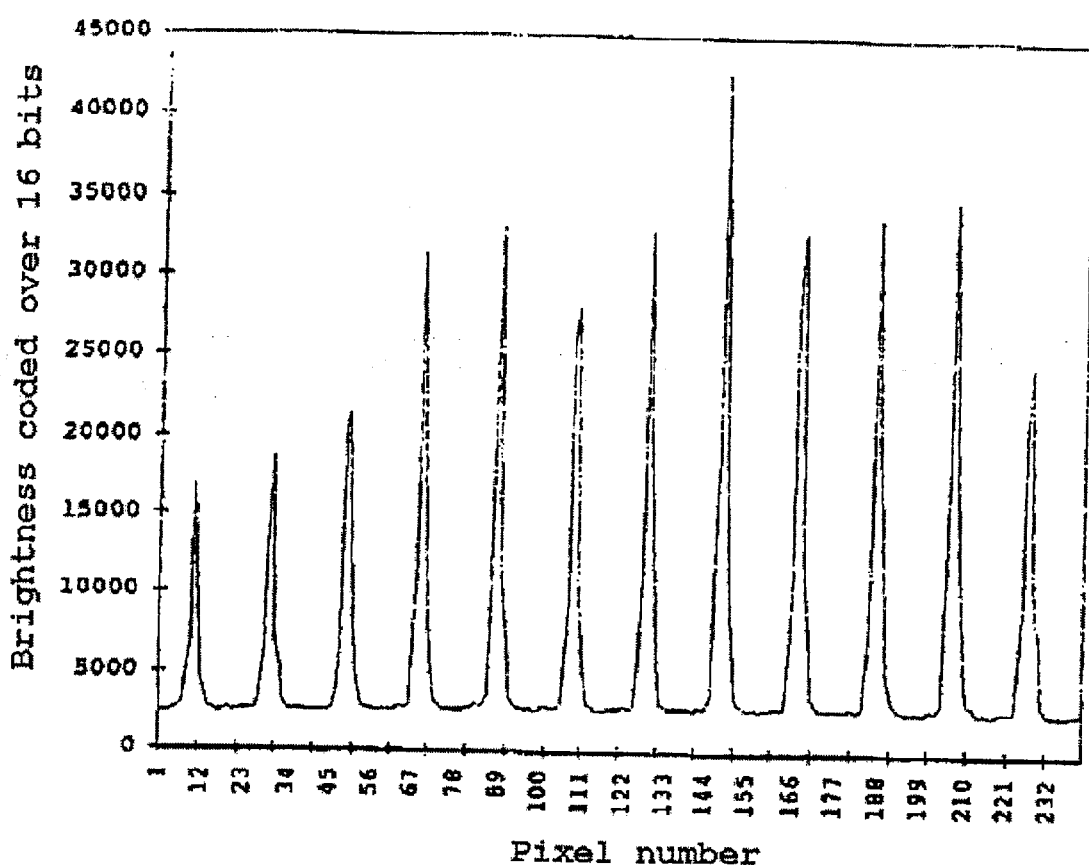

Top view

Side view

OPTICAL DEVICE FOR THE CONTACTLESS MEASUREMENT OF DISTANCE OF A LIGHT SOURCE

The present invention relates to an optical device for contactless measurement of distance from a light source. For example, it applies in the industrial field to non-destructive dimensional checking (measurement of levels or of thickness, checking the profile of components, cartography, robot position-fixing).

Among optical devices for contactless distance measurement, the triangulation systems, which are very widespread in the industrial field, form low-cost and easy-to-use devices. The principle of the measurement of the distance from an object to the device is the calculation of the angle at which this object is seen. A point or line of light projected off-axis (that is to say along an axis differing from the optical axis of the system) onto the object are re-imaged onto a plane in the vicinity of that of a detector forming a light spot; in this type of device, the object is regarded as being a point; the position of the spot on the detector, defined, for example, by the centre of gravity of the distribution of the brightness, is proportional to the tangent of the angle at which the projected point or the line is seen. This device carries out no image recognition and does not need to have good resolution. In contrast, it works with optics of low numerical aperture and exhibits a good depth of measurement field. One of the main drawbacks of this method is the off-axis projection by an illumination system of the light source, which has the effect of creating shadow regions which cannot be measured, in particular when the measured object contains high spatial frequencies (that is to say steep slopes). Moreover, the dimensions of such a system increase markedly with the working distance, because of the angle necessary between the transmission channel and the reception channel.

The devices based on the principle of stereoscopy, developed, for example, for motor vehicle applications, are superior. They employ two optical systems associated with two optical detection means separated by a distance L, each optical system forming one image of an object, the distance from the object then being determined by the measurement of the separation λ between the two images given by the two detection means. In this type of device, the accuracy of measurement of the distance is directly proportional to the distance L, which dictates having two separate detection means sufficiently far apart from one another. That being so, this type of device is bulky and constricting in use, since it requires very high stability as to the relative position of the detectors. In order to gain in accuracy, some of these devices possess improved image-processing and recognition algorithms, allowing them better to assess the separation λ (see, for example, the patent EP 0 558 026). These devices require optics with high numerical aperture (low focal-length/diameter ratio) in order to have very good optical resolution, and therefore exhibit a shallow depth of measurement field which dictates that they work with field-adapting objective lenses.

Other distance-measuring devices are based on the investigation of the defocusing of the image point of an object point through a main lens when the object point is shifted on either side of a nominal position (see for example the IEEE document "Transactions on pattern analysis and machine intelligence", vol. 14, No 2, Febuary 1992, pages 99–106, Adelson et al.).

The invention proposes a compact distance-measuring optical device, with excellent accuracy, exhibiting a good depth of measurement field and capable of working on the axis of the device. It includes a set of imaging means forming, from one light source, a set of light spots on a detection means, the distance from the source being determined on the basis of the relative position of the spots. These imaging means are positioned in a plane close to the pupillary plane, each means constituting a sub-pupil. In the device according to the invention, the accuracy on the distance depends on the number of light spots. The higher this number, the more accurate the measurement; hence, with sufficiently small imaging means, for example micro-lenses, the device requires only a single detection means, for example a linear array or a matrix of detectors.

More precisely, the invention relates to a device for contactless measurement of distance from a light source including an optical detection means formed by elementary detectors and a set of N imaging means (6), N≧3, characterised in that:

the imaging means make it possible to image the light source on a plane in the vicinity of that of the detection means, thus forming, on the said means, a set of at least three light spots, each spot being spread over at least two elementary detectors;

the device further includes a calculating circuit making it possible, on the basis of the relative positions of at least three light spots, to calculate at least one parameter characteristic of the distance from the light source to the device with an accuracy depending on the number N of light spots.

Advantageously, the calculating circuit may include a calibration table containing at least one calibration parameter the values of which are determined for certain distances from the light source and compares the characteristic parameter with the values of the said calibration parameter. According to one operating mode, the device may further includes a circuit for spatial position-fixing of the light spots on the detection means, determining, for each light spot, its position with respect to a reference origin. The device according to the invention exhibits the advantage of being compact, simple to use, and fast since it employs simple calculating algorithms; it works with imaging means with low numerical aperture since it does not require optical resolution and thus exhibits a great depth of field without it being necessary to use a field-adapting objective lens, even if that were possible. Moreover, such a device can operate on the axis, its large number of imaging means limiting the shadow regions which cannot be measured.

Further advantages and characteristics of the invention will emerge on reading the description illustrated by the following figures:

FIG. 3 shows the profile of the light spots in an example device according to the invention.

Figure 1:
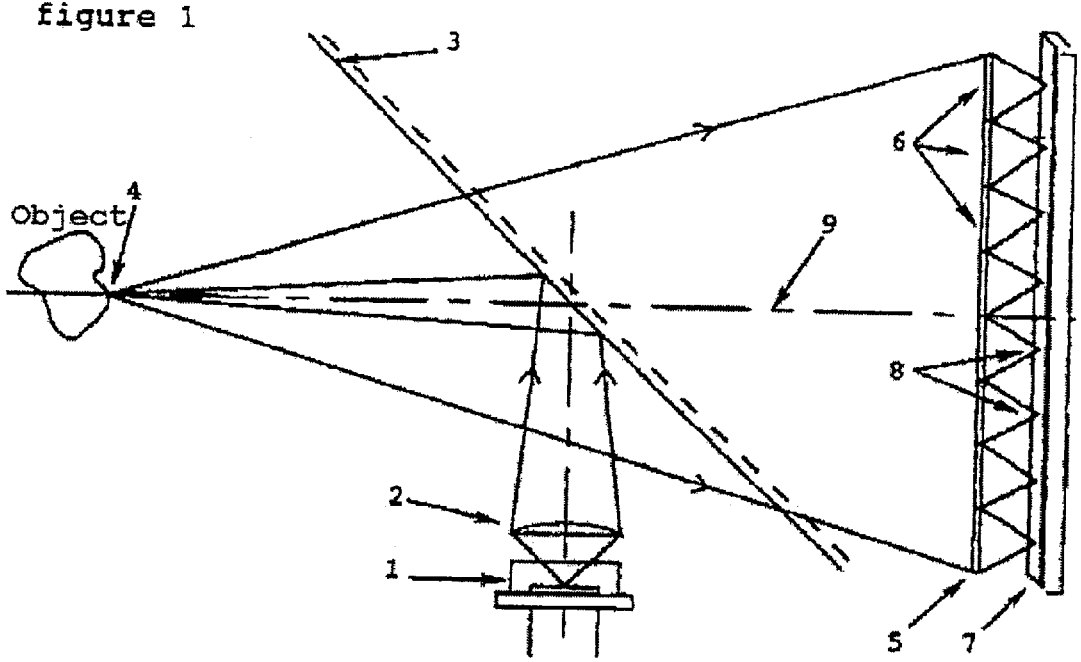
FIG. 1 represents a first example of a device according to the invention.
Figure 2:
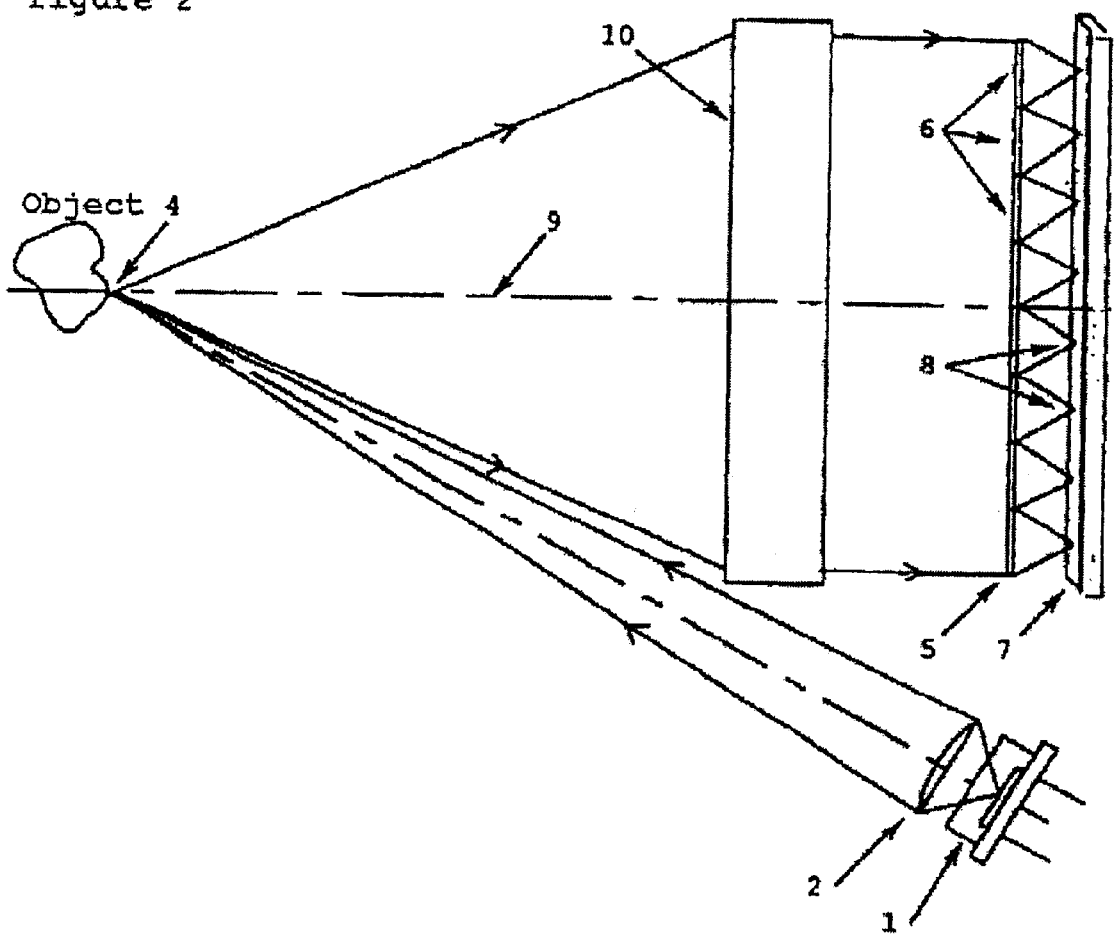
FIG. 2 represents a variant of the device employing an illumination system placed off-axis and a shaping objective lens.
Figure 6:
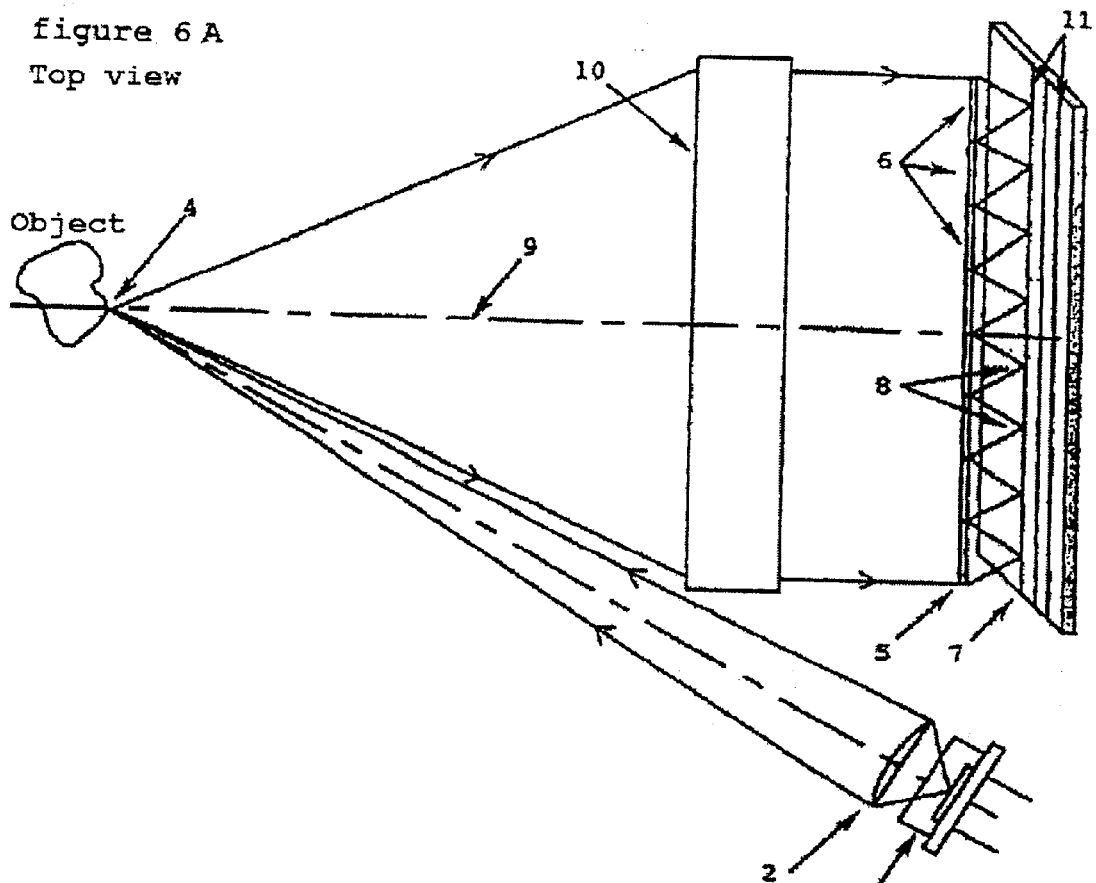
FIGS. 6A and 6B represent a variant of the device in a particular configuration in which the secondary light source is a line.
Figure 6:
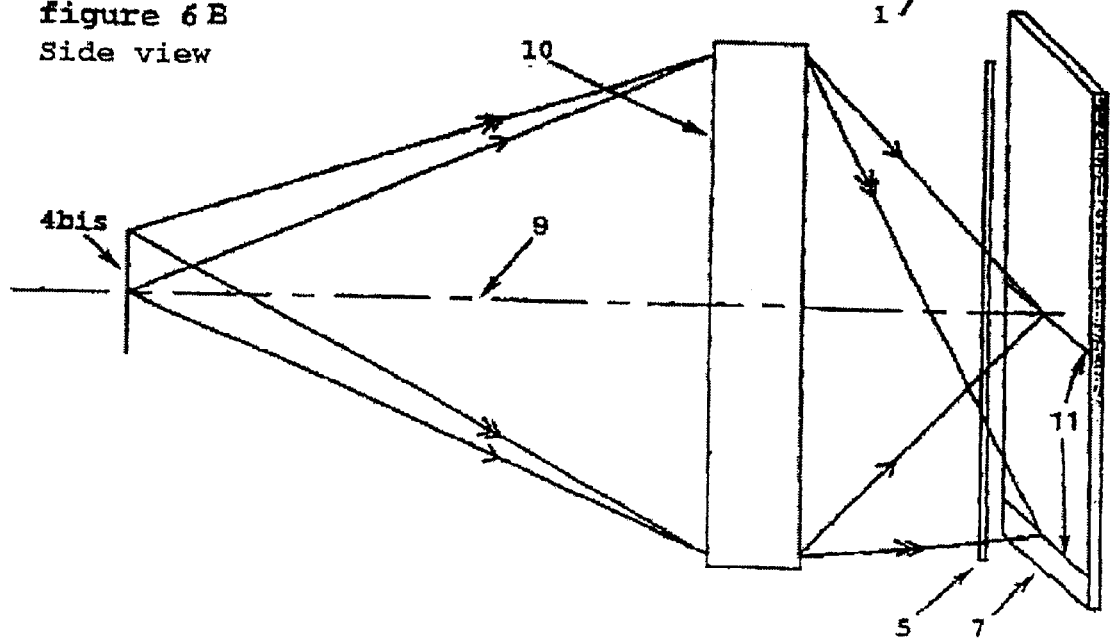

FIGS. 1 and 2 illustrate examples of devices according to the invention making it possible to measure the distance from a light source 4. In the first place, the source is regarded as being point-like or nearly point-like. In general, this source may be natural (a fluorescent molecule for example), or may be a light source consisting of an elementary surface of an object illuminated with the aid of an illumination system, the source then being called secondary light source. Hence, the devices illustrated in FIGS. 1 and 2 include an illumination device (1, 2) making it possible, for example, to project a point of light onto the object for which it is desired to measure the distance to the system. This point of light serves as a secondary light source 4. The light emitter 1 used for the illumination may be a laser diode coupled with an objective lens 2 providing focusing at the nominal working distance. This focusing may also be done along a line as is illustrated by FIGS. 6A and 6B and will be explained later. The illumination device may be aligned (FIG. 1) with the optical axis of the reception channel of the system 9; in this case, collinearity makes it possible to overcome the risks of non-measurable shadow areas. The aligning of the illumination system on the axis may be carried out using a separating plate 3. The illumination device may be off-axis (FIG. 2), which simplifies the system; this configuration may be used particularly for "long range" applications for which the shadow regions are negligible. There is no angular constraint on positioning of the illumination system in a non-collinear configuration, in contrast to the triangulation systems of the prior art.

If the object is diffusing, the light source sends back the light in all directions, some of which comes back to the reception system. If the object is reflecting, the light source sends back the light in a cone the aperture of which is defined by the illumination device, and the direction of the axis of which depends on the orientation of the object. It is consequently necessary to provide for suitable matching: either a physical orientation of the object, or a high optical aperture of the illumination device as is encountered in microscopy.

The device according to the invention includes a detection means 7 also called detector, formed by elementary detectors. It further includes a set of N imaging means 6A, N≧3, such that they make it possible to image the light source 4 on a plane in the vicinity of that of the detection means 7, thus forming, on the said means, a set of at least three light spots 8, each spot being spread over at least two elementary detectors. Placed in a pupillary plane, the imaging means make it possible to break down the beam originating from the light source into the same number of sub-pupils.

In the example illustrated in FIGS. 1 and 2, the detection means is a linear array of elementary detectors (detectors arranged into a line) and the imaging means consist of a linear array of substantially identical micro-lenses arranged side-by-side with a substantially constant pitch. We will see in what follows that it is not necessary for the calculation of the distance from the source for the pitch to be constant, but the periodic distribution of the imaging means, even if the period is not constant, simplifies the calculations making it possible to calculate the distance. The linear array of micro-lenses is placed in front of the linear array of detectors, parallel to it. For example, a CCD array 28 mm long comprising 2048 elementary detectors or pixels of 14 μm (standard format); it is then possible to choose to work with a linear array of 100 micro-lenses of 287 μm diameter; each of the sub-pupils of the micro-lenses will then correspond to about 20 elementary detectors on the detector; a focal length of 10 mm, for example, will be chosen, which is relatively large with respect to the diameter of the micro-lens so that the profile of the light spots remains within the diffraction limit; in the example described, the diffraction limit is about 50 μm, which corresponds to 3 or 4 elementary detectors. FIG. 3 shows the profile of light spots obtained experimentally on the detector (in this particular case, a CCD array). The micro-lenses may, for example, be spherical or cylindrical; in this case, the generatrices of the cylindrical lenses are substantially parallel and the axis of the linear array of detectors is perpendicular to that of the generatrices.

FIG. 2 describes a variant of the device comprising an optical system 10 for shaping the beam. This makes it possible to define a nominal position of the source to be measured (at the focal point of this system), to which corresponds a specific distribution of the light spots, and its benefit in calculating the distance from the source will be explained in what follows. This optical system may be a simple lens or a combination of lenses. It may moreover comprise a cylindrical lens making it possible to condense the light onto a linear array of detectors (since the latter is generally not very wide: a few microns to a few hundreds of microns); this configuration is particularly beneficial in the case in which the system uses a linear array of cylindrical lenses as an imaging means.

According to one variant, it is also possible to use a linear array of cylindrical micro-lenses placed in front of a matrix of elementary detectors. Each micro-lens then forms, from the light source, a line parallel to the axis of the generatrices on the matrix of detectors. The signal can then be summed along the line to enhance the signal-to-noise ratio.

The imaging means may, according to another variant, be a matrix of spherical or aspherical micro-lenses forming a set of light spots on a matrix of elementary detectors.

Figure 4A:
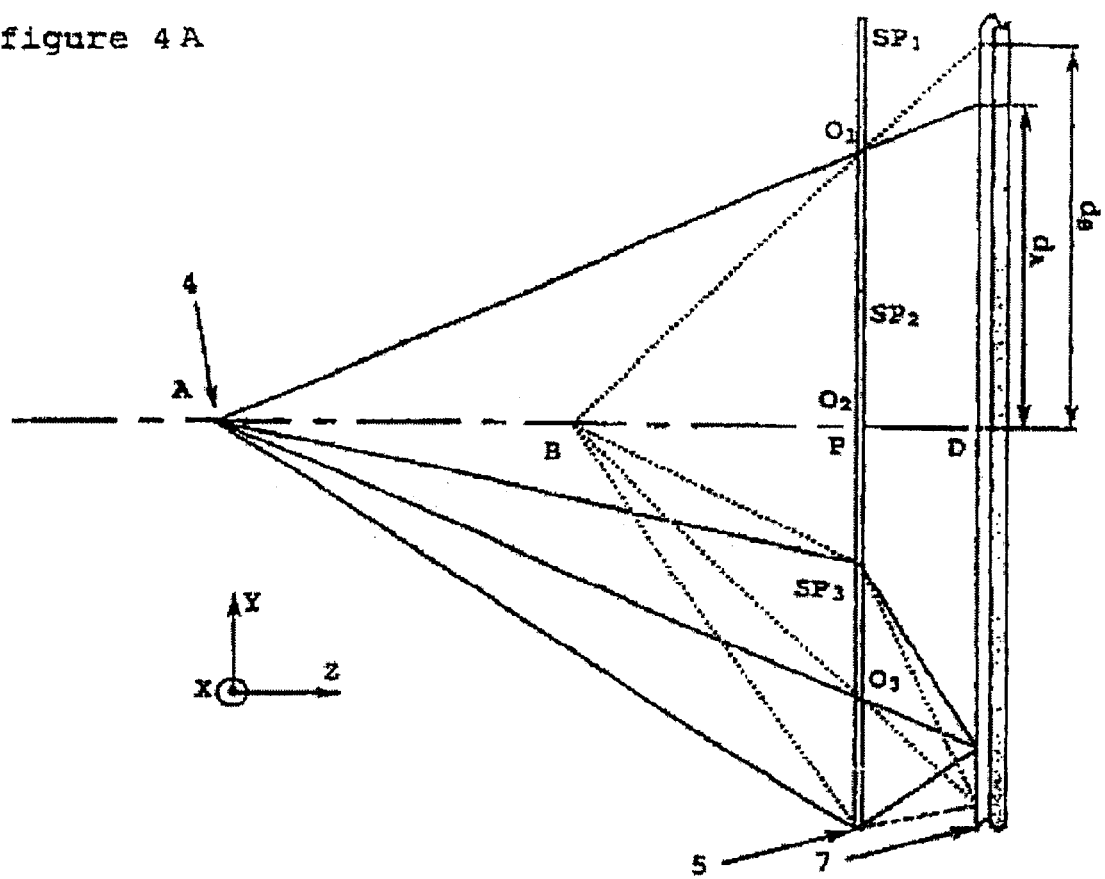
FIGS. 4A, 4B, 4C illustrate principles for calculating the distance according to one operating mode of the invention.
Figure 4B:
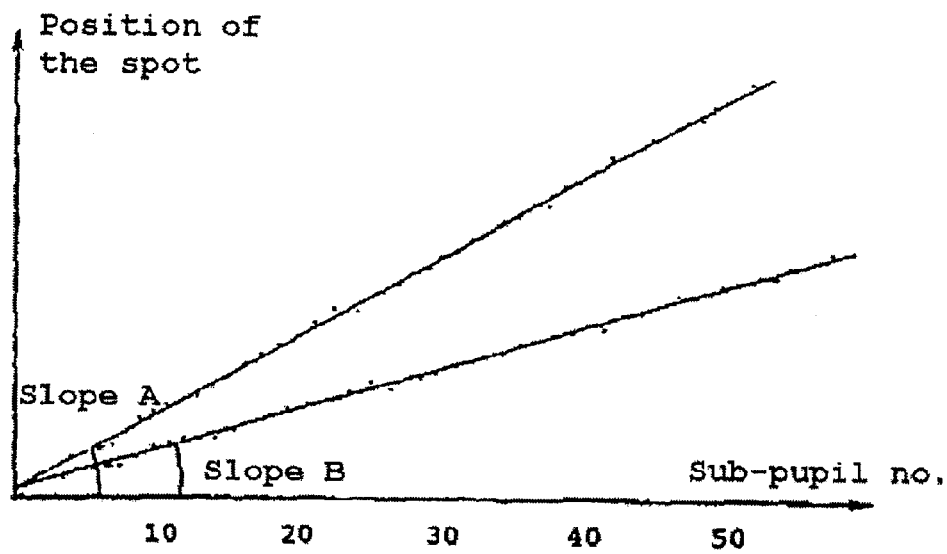
Figure 4C:
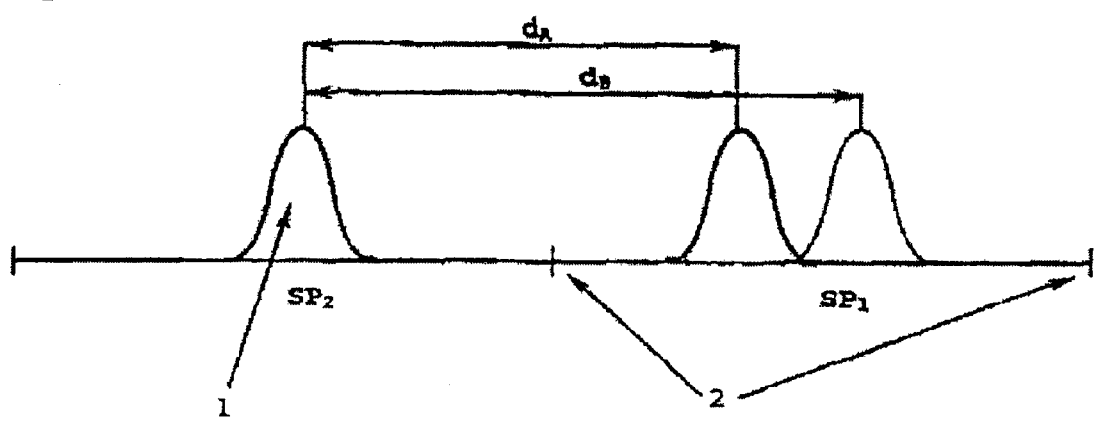

The device according to the invention further includes a calculating circuit making it possible, on the basis of the relative positions of at least three light spots, to calculate at least one parameter characteristic of the distance from the light source to the device. According to one variant, it further includes a circuit for spatial position-fixing of the light sources on the detection means, determining, for each light spots, its position with respect to a reference origin. FIGS. 4A, 4B and 4C make it possible to illustrate possible modes for calculating the distance from the source.

The position-fixing circuit makes it possible to determine the position of the centre of each spot with respect to a reference origin. As far as the calculation of the centre of each spot is concerned, various techniques exist: the spatial centre of gravity of the few elementary detectors over which the spot is spread is calculated, for example, by assigning, to each elementary detector, a coefficient relating to its level of illumination; the centre of gravity then constitutes the centre of the spot and is determined to within a fraction of width of the elementary detector. It is also possible to interpolate the spot by its theoretical shape or by a mathematical function approximating to it (a cardinal sine ($\sin(x)/x$), a Gaussian function ($\exp(-x^2)$, . . . ), a technique which is known and practised in the astronomy field. The position of the centre of each of the light spots can be measured by considering various origins: with respect to a fixed point of the detector or with respect to the end or to the centre of each of the geometric projections of the corresponding sub-pupils on the detector (in this case, the origin is said to be "floating").

In order to explain possible modes of calculating the distance from the source, three imaging means are considered, for example three micro-lenses side-by-side extracted from the central part of a linear array of micro-lenses and forming three sub-pupils of the device, referenced in FIG. 4A by $SP_1$, $SP_2$ and $SP_3$. The micro-lenses are assumed to be distributed with a substantially constant pitch. The light source 4, assumed to be point-like or nearly point-like, sends rays into the device from successively any positions A and B (A and B lie in the measurement field explained below). The rays coming from the light source pass through the plane 5 of the micro-lenses. Consequently, the beam is broken down along the corresponding sub-pupils. The lenses re-image the source in the plane of the detector 7 for a nominal position of the source (there is then, in this particular case, conjugation between the source and the detector) and in a plane in the vicinity of it for an other position (there is defocusing in the plane of the detector). In both cases, a set of light spots are formed on the detector, which are distributed linearly in the example chosen, each of them corresponding to one sub-pupil. The defocusing is not troublesome since, with the imaging means being open very little, they operate in the diffraction regime and do not carry out imaging, that is to say that the dimensions of the light spot correspond to those of the diffraction spot of the imaging means.

These light spots are centred on the rays originating from the source and passing through the optical centre $O_n$ of the micro-lens corresponding to a sub-pupil $SP_n$ as illustrated in FIG. 4A (the rays in solid line relate to position A and those of position B are in dotted line). In this Figure, the defocusing has been deliberately ignored (A and B are re-imaged in the plane of the detector) the only consequence of which is a more or less extensive spreading of the light spot (but it remains centred on the ray defined above). In the particular case set out in FIG. 4A, the position of the light spot corresponding to the sub pupil $SP_2$ is unvarying, since the optical axis of the lens inscribed within $SP_2$ is coincident with the axis of movement of the light source (axis defined by (AB)). When using the device in practice, the central sub-pupil is not necessarily well centred, but it is nevertheless close to the centre and consequently the position of the light spot changes very little.

FIG. 4A makes it possible to show one advantage of the optical shaping system 10 illustrated by FIG. 2. In fact it makes it possible, on the one hand, to be able to adapt the working distance easily (by changing the optical system) and, on the other hand, to be able to have available the entire possible dynamic range of the system. In fact, FIG. 4A shows that, with no shaping objective lens, the light spot will always be off-centre and half of the sub-pupil remains inaccessible to it. In contrast, FIG. 1 shows that, at the nominal distance, the light spot is centred in the sub-pupil (focal point of the lens). When the optical shaping system 10 is omitted, the matrix of lenses then alone and directly carries out both breaking-down of the beam into its sub-pupils and focusing of it into light spots on the detectors.

One calculating mode consists in determining the average spatial separation separating the successive light spots two-by-two. This approach is possible since, in many particular instances of use, the light spots are equidistant from one another (which can be likened to a linear distribution of the positions of the light spots). This is the case when the imaging means are substantially identical and distributed with a near-constant pitch. This separation is a parameter characteristic of the distance from the source to the device. This is because, if the separations between two successive light spots are called dA and dB, for the positions A and B of the source respectively, then, according to the example of FIG. 4A:

$$d_A = \frac{[AD]}{[AD]-[DP]}[O_1O_2], \text{ and } d_B = \frac{[BD]}{[BD]-[DP]}[O_1O_2]$$

$[O_1O_2]$=p is the pitch of the sub-pupils and [DP]=f, the distance separating the plane of sub-pupils from the detector, is a geometric parameter of the system. Hence it is possible to extract the parameters [AD] and [BD) to be determined:

$$[AD] = \frac{f \times d_A}{d_A - p} \text{ and } [BD] = \frac{f \times d_B}{d_B - p}$$

This approach reveals the redundancy of the information supplied by the system (dA is measured (N−1) times and dB (N−1) times if N is the number of spots).

One practical way of calculating this average separation consists in determining the slope of the straight line representing the position of the centre of each spot as a function of the corresponding sub-pupil, indexed, for example, by a number (the sub-pupil 0 or 1 being chosen equally from among the set of sub-pupils). FIG. 4B illustrates the distribution along a straight line of the points defined by the pairs of positions of each sub-pupil and positions of the centre of each of the light spots. The dispersion about this straight line is related to defects in the system, especially to defects in manufacturing the matrix of micro-lenses. The calculation of the slope of the straight line can be done, for example, by a conventional linear-regression method (least-squares method): the sum of the squares of the separations between the measurements and the corresponding values of the estimate straight line are minimised (the least-squares straight line is thus obtained).

FIG. 4C details the distribution of energy over the detector in the sub-pupils $SP_1$ and $SP_2$ of FIG. 4A. The distances separating the centres of the light spots formed (thick line for the source placed at A and fine line for the source placed at B) differ because of the longitudinal displacement of the source. This figure makes it possible to understand why the system can tolerate defocusing, even substantial: the spot will be more spread out, but its centre will remain unchanged. Moreover, the low numerical aperture of the imaging means and the diffraction regime limit the significance of the defocusing.

The functions explained above show that the separation measured is a one-to-one function of the longitudinal position of the source. The same is true for the slope. The definition of the longitudinal field of measurement, or depth of field, depends on the geometrical parameters chosen (number of sub-pupils, diameter and focal length of the lenses). it is necessary for all the light spots formed on the detector to remain usable, that is to say for each of the light spots to retain a satisfactory profile (not too much aberration and no excessive defocusing).

As far as the field of measurement is concerned, it is possible more generally to define a measurement volume. The light source should lie within this volume in order to be able to be measured. The said volume is defined as a function of the position and of the quality of the light spots: along the X axis (see FIG. 4A), it is necessary for the light spots to remain on the detector; along the Y axis, it is necessary for the light spots to remain of good quality and to be in sufficient numbers (they are imaged onto the adjacent sub-pupils, therefore off-axis); along the Z axis, it is a question of the depth of field, discussed above. Consequently, the measurement volume changes as a function of the characteristics of the system.

Figure 5:
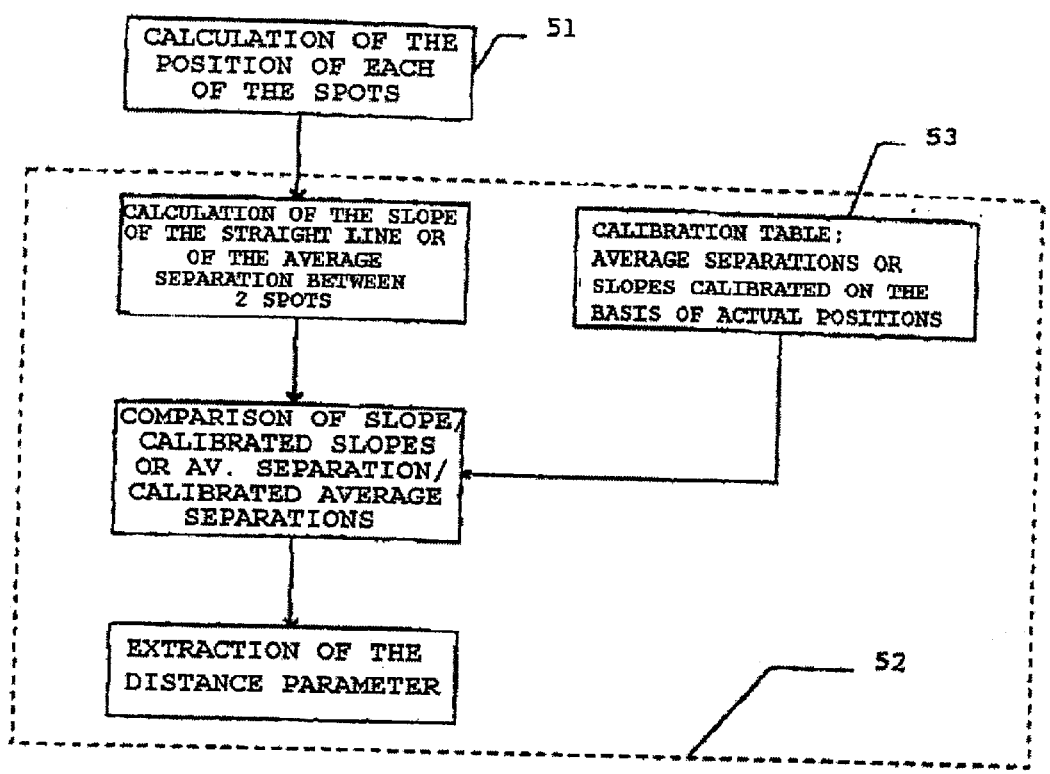
FIG. 5 represents, in diagrammatic form, a possible calculating mode for this operating mode.

The functions explained above show how, on the basis of knowledge of the geometric parameters of the device, it is possible directly to determine the distance from the light source to the device. In practice, the calculating circuit may include a calibration table containing at least one calibration parameter (for example average separation or slope of the straight line as they were discussed above), the values of which are determined for certain distances from the light source. These values can be determined in advance in an experimental or theoretical manner. It then compares the parameter characteristic of the distance determined in the course of the measurement with the values of the calibration parameter. FIG. 5 describes the stages of a mode of operation of a device according to the invention including a position-fixing circuit 51 and a calculating circuit 52 including a calibration table 53, the calculating circuit comparing the average separation or the slope which are determined in the course of the measurement with the values of the calibration parameters in order to extract therefrom the value of the distance from the source.

The foregoing examples have dealt with light spots arranged linearly. In a more general way, each imaging means being indexed, the distance from the light source can be determined on the basis of a parameter characteristic of the curve representing the position function of each light spot as a function of the indices of the imaging means. A calibration table containing calibration parameters determined for certain distances from the source may here again be used by the calculating circuit in order to extract the distance from the light source.

According to another method of operation of the device according to the invention, it is not necessary, by means of the position-fixing circuit, to determine the position of the light spots. The calculating circuit may carry out a spatial-frequency analysis of the distribution of the light spots, the parameters characteristic of the distance from the light source then being determined on the basis of the frequency spectrum. For example, if the set of light spots are distributed substantially periodically, one of the parameters determined on the basis of the frequency spectrum is then the inverse of the period. The frequency analysis can be carried out, for example, by means of conventional fast-Fourier-transform algorithms.

FIGS. 6A and 6B represent a variant of the device described above applied to the simultaneous measurement of the distances from several point-like light sources. More particularly, what is involved is a set of light sources forming a line.

The light emitter 1 and its objective lens 2 are not necessarily aligned with the optical axis 9 of the receiving system. The secondary light source is created by the transmitter of light projected along a light line 4 and 4bis. FIG. 6A (top view) is a view in a plane perpendicular to the projected line 4; FIG. 6B (side view) represents the system in a plane containing the projected line 4bis. The detector used may be a matrix CCD camera 7.

The light coming back is picked up by an optical shaping system 10. The beam is then broken down (as in the case of the first device described) in the plane 5 of the sub-pupils along the sub-pupils 6, then focused onto the detector 7. FIG. 6A reveals the similarity in measurement between a device measuring the distance from a point-like and nearly point-like light source and a device measuring the distance from the light source consisting of a set of point-like or nearly point-like sources arranged into a line. In each plane perpendicular to the line, the same elements of the first device described are again encountered: a light source (intersection of the line and of the perpendicular plane in question), a linear array of imaging means, for example micro-lenses, the equivalent of a linear detector (the line 11 of the matrix detector in the perpendicular plane in question): the distance separating the said light source from the device is a function of the separation measured between the centres of gravity of the corresponding light spots lying on the said linear detector (line 11 of the matrix detector 7). A supplementary implementation constraint should nevertheless be taken into account: the projected light line should be conjugated or close to conjugation with the detector in the plane orthogonal to the direction of the linear array of the imaging means. If this is not the case, the spatial resolution is degraded. The spatial resolution of such a device, that is to say the number of measurement points obtained on the profile, is a function of the number of elementary detectors in the direction parallel to the projected light line, as well as of its defocusing.

The device according to the invention is intended to be substituted for an entire range of sensors (in particular triangulation sensors) in the industrial field for checking dimensions. Moreover, this device opens up novel fields of application in areas such as industrial vision (for non-destructive checking), biology (for example, following the trajectory of a fluorescent object), robotics, etc.

What is claimed:

1. Device for contactless measurement of distance from a light source including an optical detection means (7) formed by elementary detectors and a set of N imaging means (6), $N \geq 3$, characterized in that:

the imaging means make it possible to image the light source on a plane in the vicinity of that of the detection means, thus forming, on the detection means, a set of at least three light spots, each spot being spread over at least two elementary detectors;

the device further includes a calculating circuit making it possible, on the basis of the relative positions of the at least three light spots, to calculate at least one parameter characteristic of the distance from the light source to the device with an accuracy depending on the number N of light spots.

2. Measuring device according to claim 1, characterised in that the calculating circuit includes a calibration table containing at least one calibration parameter the values of which are determined for certain distances from the light source and compares the characteristic parameter with the values of the said calibration parameter.

3. Device according to claim 1, characterised in that it further includes a circuit for spatial position-fixing of the light spots on the detection means, determining, for each light spot, its position (dA) with respect to a reference origin.

4. Measuring device according to claim 3, characterised in that:

each imaging means is indexed (SP1, SP2, etc.);

the parameter characteristic of the distance calculated by the calculating circuit is at least one of the parameters characteristic of the curve representing the position function of each light spot (dA) as a function of the indices of the imaging means (dA=f(SP1, SP2, . . . ).

5. Measuring device according to claim 4, characterized in that the positions of the light spots determined by the position-fixing circuit are substantially distributed along a line, the said curve is then substantially a straight line and the parameter calculated by the calculating circuit is the slope of the straight line.

6. Measuring device according to claim 1, characterised in that the calculating circuit carries out a spatial frequency analysis of the distribution of the light spots, the parameters characteristic of the distance from the light source then being determined on the basis of the frequency spectrum.

7. Measuring device according to claim 6, characterised in that the set of light spots are distributed substantially periodically, one of the parameters determined on the basis of the frequency spectrum then being the inverse of the period.

8. Measuring device according to claim 1, characterised in that the imaging means consist of a linear array of cylindrical micro-lenses, substantially identical, arranged side-by-side with a substantially constant pitch, the generatrices of the cylinders being substantially parallel, and in that the detection means are a matrix of elementary detectors or a linear array of elementary detectors the axis of which is perpendicular to the generatrices of the micro-lenses.

9. Measuring device according to claim 1, characterised in that the said light source consists of an illuminated elementary surface of an object, thus forming a secondary light source, and in that it includes an illumination system making it possible to create the said secondary light source.

10. Measuring device according to claim 9, characterised in that it includes a beam splitter placed between the secondary light source and the imaging means, the splitter directing the light originating from the illumination system onto the said elementary surface and transmitting, to the imaging means, the light originating from the secondary light source, making it possible to make the axis of the illumination system and the optical axis of the device collinear.

11. Measuring device according to claim 1, further comprising a shaping optical system placed between the light source and the imaging means for adapting the field for measuring distance from the light source.

12. Device for contactless measurement of distance from a light source comprising:

an optical detector comprising a plurality of elementary detectors;

N imaging elements, where $N \geq 3$, the imaging elements being arranged with respect to the optical detector so that light from the light source can be focused on a plane in a vicinity of the optical detector to form at least three light spots, each of the spots being spread over at least two of the elementary detectors; and a calculating circuit receiving as an input information related to relative positions of the at least three light spots, the calculating circuit producing as an output data representative of at least one parameter characteristic of a distance from the light source to the device.

13. The device of claim 12, wherein the calculating circuit is constructed to perform spatial frequency analysis of distribution of the light spots.

\* \* \* \* \*